G. A. PFLUEGER.
FISHING FLOAT.
APPLICATION FILED JUNE 2, 1909.
983,310.
Patented Feb. 7, 1911.
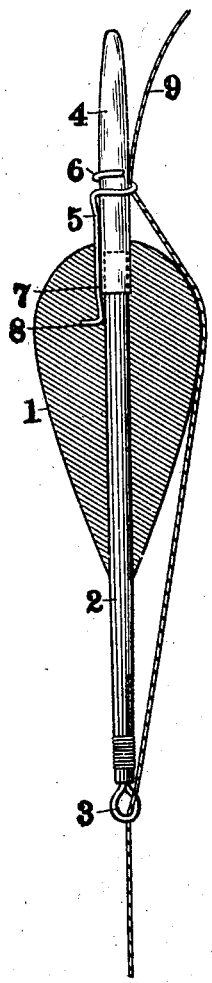
Witnesses:
INVENTOR—
George A. Pflueger,
BY
ATTORNEY.

UNITED STATES PATENT OFFICE.

GEORGE A. PFLUEGER, OF AKRON, OHIO, ASSIGNOR TO THE ENTERPRISE MANUFACTURING COMPANY, OF AKRON, OHIO, A CORPORATION OF OHIO.

FISHING-FLOAT.

983,310.

Specification of Letters Patent.

Patented Feb. 7, 1911.

Application filed June 2, 1909. Serial No. 499,689.

*To all whom it may concern:*

Be it known that I, GEORGE A. PFLUEGER, a citizen of the United States, residing at Akron, in the county of Summit and State of Ohio, have invented new and useful Improvements in Fishing-Floats, of which the following is a specification.

This invention relates to improvements in means for attaching floats to fishing lines so that the float can be readily used on the line without danger of being accidentally detached therefrom and at the same time the attaching means which is carried by the float is so anchored that it cannot be accidentally removed, thus preventing any danger of losing it.

The object of this invention is to provide a line-attaching device for a float, where the pin used is composed of a quill or similar material on account of the frail nature of which, the attaching means cannot be tightly wrapped about the pin for holding it against slipping off, by reason of danger of breaking the quill, nor can the fastening device be anchored against removal by inserting an end thereof in an aperture in the pin, comprising a spirally-formed member wrapped one or more times about the pin with one end thereof anchored in such a manner that longitudinal movement of the attaching means is prevented and all danger of losing the device eliminated.

With the foregoing and other objects in view, the invention consists in the novel construction, combination and arrangement of parts constituting the invention to be hereinafter specifically described and illustrated in the accompanying drawing which forms a part hereof wherein is shown the preferred embodiment of the invention, but it is to be understood that changes, variations and modifications can be resorted to which come within the scope of the claims hereunto appended.

The drawing presented is a vertical, central, longitudinal, sectional view of a fishing float provided with my improved attaching means shown in operative relation with a fishing line.

Referring to the drawing, the reference numeral 1 designates the body of the float which is preferably composed of some material such as wood or cork, although the material of which the same is composed forms no part of this invention. The float is preferably provided with a longitudinally-extending aperture therethrough in which is mounted a depending pin 2 provided at its lower end with an eye 3. The upper end of the aperture in which is mounted the pin 2 is preferably made slightly larger than the balance thereof, if the body of the float is composed of wood or some relatively hard substance, but if made of cork the aperture may be of uniform diameter throughout. A pin 4 consisting preferably of a quill is inserted in the upper end of the aperture, preferably telescoping the upper end of the pin 2.

The fastening means for the line consists of a member 5 preferably formed of non-corrosive wire having sufficient inherent rigidity to be self-maintaining under service conditions and to retain its shape and preferably possessing sufficient resiliency to return to normal shape after being slightly bent during the placement of a fishing line. The member 5 preferably consists of one or more spirally-arranged coils 6 wrapped about the quill from which depends a straight portion 7 terminating in a laterally-bent end 8 adapted to be forced into the material of which the body of the float is composed, thereby anchoring the member 5 against movement.

In setting up a float of this description, the lower end 7 of the fastening device is inserted in the aperture in the body of the float and the laterally-projecting end 8 forced into the material, as clearly shown in the drawing. The depending pin 2 is then inserted in the aperture which holds the lower end 7 of the fastening device fixedly against movement, after which the quill 4 is passed downwardly through the space inclosed by the convolutions 6 of the fastening member into the aperture in the body of the float 1 and preferably into telescopic engagement with the upper end of the depending pin 2.

It will be noted that the pins 2 and 4 in the aperture securely hold the fastening device 5 against unintentional withdrawal; at the same time the securing of the lower end of the fastening member in the body of the float fixedly anchors the former against being lost when in use.

In securing a float such as has just been described to the line 9, the operation consists in passing the line under the free end of the coiled portion 6 of the member 5 and by revolving the float the line is wound under the convolutions and coils of the member until it is firmly grasped thereby and pressed against the pin 4 sufficiently firmly to prevent unintentional movement of the float on the line. The other end of the line is passed through the eye 3 on the pin 2. This arrangement permits the float to be moved by hand up or down the line and it can only be detached therefrom by uncoiling the line from the spiral portions 6 of the member 5; at the same time the lower end 7 being securely mounted in the body of the float the member is prevented from being detached therefrom and lost, which latter result frequently occurs where no means are provided for securely holding the attaching means to the float.

It will of course be obvious that the laterally-extending end 8 of the member 5 may be bent in any direction in order to anchor said member against longitudinal movement on the pin 4, and while the end 8 is shown in the drawing as extending into the body of the float, it may be turned in any other direction desired, without departing from the scope of this invention.

It will also be understood that the pins 2 and 4 combinably constitute an element which is the equivalent of a single pin in the fishing operation, the particular construction employed providing for the use of a wooden portion adapted to lock the line fastening device, and a hollow cap portion supported within the body of the float by the pin 2, and supported without the body-portion by the line fastening device, the particular form of fastening the latter within the body-portion and its length within said body-portion providing an element which renders the hollow quill portion stable and not liable to become broken in use; where a quill is used in connection with a fastening device located wholly on the quill the pulling strain of the line will quickly cause the quill to become broken at its point of connection with the body portion, the device offering no protection against this action.

By the particular structure shown, I am able to make use of a quill upper portion without liability of its becoming broken under pulling strain, and at the same time, provide for frictionally binding or engaging the line with the surface of the quill, thereby tending to prevent any slipping of the line relative to the float in use, and also dispensing with any necessity for forming a particular kind of fastening or loop to engage the fastening device, such as would be required where such frictional engagement is not present; in actual practice, the formation of a proper loop is a matter of particular care and where an error is made in the formation, service conditions are liable to permit the float to become disengaged.

What I claim and desire to secure by Letters Patent, is:—

1. A float for fishing lines provided with a body portion having an aperture, a fastening device having one portion thereof provided with a laterally-turned end arranged to be inserted in said aperture and an element mounted in and extending through and beyond the opposite ends of said aperture and constituting locking means for said fastening device, the upper end of which is inclosed by the spiral convolutions of said fastening device.

2. A float for fishing lines comprising a body portion provided with an aperture, a pin mounted in said aperture and a fastening device comprising a member wound spirally about said pin with a portion thereof provided with a laterally-extending end positioned in said aperture at a point spaced from the end thereof, whereby said fastening device is anchored against unintentional movement.

3. A fishing float comprising a body-portion, a quill pin added at the upper end of said body-portion and projecting outwardly from said upper end, and a line fastening device having a spirally-wound end encircling said quill portion without the body-portion, the opposite end of said device extending within the body-portion, and being anchored therein against movement longitudinally of the body-portion.

In testimony whereof I have hereunto set my hand in presence of two subscribing witnesses.

GEORGE A. PFLUEGER.

Witnesses:
C. E. HUMPHREY,
GLENARA FOX.